(12) United States Patent
Fletcher

(10) Patent No.: US 8,078,891 B2
(45) Date of Patent: Dec. 13, 2011

(54) METHOD, DEVICE, AND SYSTEM FOR GUARANTEED MINIMUM PROCESSOR POWER STATE DWELL TIME

(75) Inventor: Terry Fletcher, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 730 days.

(21) Appl. No.: 12/215,757

(22) Filed: Jun. 30, 2008

(65) Prior Publication Data

US 2009/0327553 A1 Dec. 31, 2009

(51) Int. Cl.
*G06F 1/00* (2006.01)
*G06F 1/26* (2006.01)
*G06F 1/32* (2006.01)
*G04L 9/32* (2006.01)

(52) U.S. Cl. ......... 713/320; 713/300; 713/323; 713/178

(58) Field of Classification Search .................. 713/300
See application file for complete search history.

(56) References Cited

U.S. PATENT DOCUMENTS

| | | | | |
|---|---|---|---|---|
| 6,151,262 | A * | 11/2000 | Haroun et al. | 365/227 |
| 6,161,187 | A * | 12/2000 | Mason et al. | 713/322 |
| 7,516,342 | B2 * | 4/2009 | Jahagirdar et al. | 713/320 |
| 2007/0157036 | A1 | 7/2007 | Jahagirdar | |
| 2008/0028240 | A1 | 1/2008 | Arai | |
| 2008/0082841 | A1 | 4/2008 | Juenemann | |
| 2009/0158067 | A1 * | 6/2009 | Bodas et al. | 713/323 |
| 2009/0235099 | A1 * | 9/2009 | Branover et al. | 713/322 |

* cited by examiner

*Primary Examiner* — Chun Cao
*Assistant Examiner* — Samantha Hoang
(74) *Attorney, Agent, or Firm* — Derek J. Reynolds

(57) ABSTRACT

A method, device, and system are disclosed. In one embodiment the method includes causing a processor to enter into a first power state. Then an interrupt is received that signals the processor to leave the first power state. The method continues by causing the processor to remain in the first power state if the interrupt was received less than a minimum dwell time after the processor entered the first power state.

17 Claims, 2 Drawing Sheets

METHOD, DEVICE, AND SYSTEM FOR GUARANTEED MINIMUM PROCESSOR POWER STATE DWELL TIME

FIELD OF THE INVENTION

The invention relates to guaranteeing a dwell time in a processor power state.

BACKGROUND OF THE INVENTION

Many modern processors have multiple power states, which can be utilized to balance the needed performance of the processor against the power the processor consumes. Some power states are relatively efficient to enter into and exit from. Other power states have significant and power hungry requirements for performing the entry and exit processes. With a particular workload, certain processors can become power inefficient if they are continually forced to enter and exit a power state that has highly power inefficient entry and exit processes.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method, device, and system for enforcing a minimum dwell time a processor must remain in a particular power state are disclosed. The processor can enter a power state that has an associated minimum dwell time. Once the processor is in the power state with the minimum dwell time, the processor must remain in that state until the minimum dwell time has passed. Thus, any interrupts (i.e. break events) that would otherwise cause the processor to immediately exit the power state will not be honored until the minimum dwell time has passed. Rather, the break event(s) will be held in waiting and then allowed to proceed to cause the processor to exit the power state when the processor has been at least been in the power state for the duration of the minimum dwell time.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Figure 1:
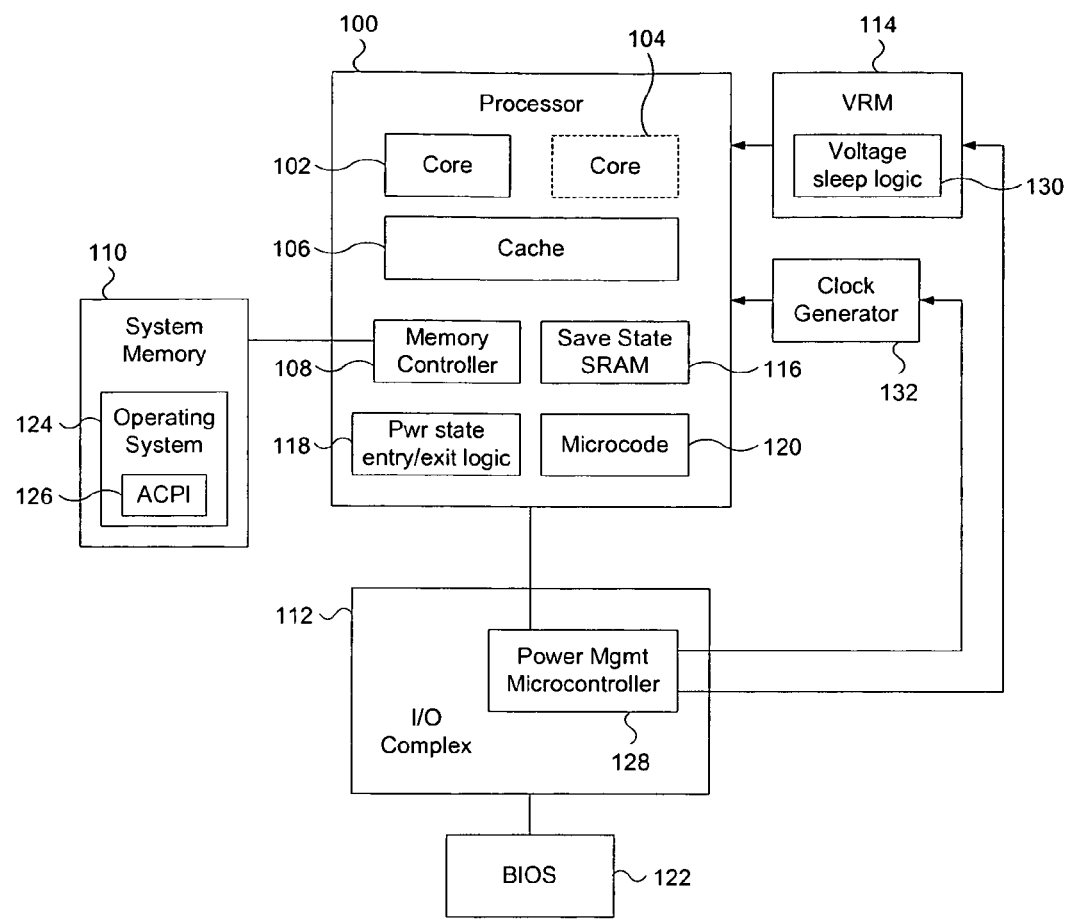
FIG. 1 describes an embodiment of a device and computer system capable of providing a minimum dwell time in a power state to gain greater average power consumption efficiency while in the state.

FIG. 1 describes an embodiment of a device and computer system capable of providing a minimum dwell time in a power state to gain greater average power consumption efficiency while in the state.

The term "average power consumption" refers to the average amount of power consumed by a processor or other integrated circuit over a period of time. For example, if a processor consumes a total of 20 Joules over the course of 10 seconds, the processor's average power consumption is 2 Joules per second, or 2 W. Thus, although a certain processor power state may lead to a lower average power consumption over a long period of time, the process required to enter the processor into that state may consume a much more significant amount of energy. Therefore, if the average power consumption of a processor is taken over a fairly short period of time around the entry point into the power state, then the average power consumption may be significantly higher than what it would otherwise be if averaged over a greater length of time.

In different embodiments, the computer system may be a desktop computer, a server computer, a laptop computer, a handheld electronic device, a television set top computer, an integrated computer within an appliance or vehicle, or any other type of conceivable computer system within the scope of the various embodiments described below.

In many embodiments, the computer system includes a processor 100. The processor may include a single core such as core 102, or have multiple cores, such as cores 102 and 104 (or more). A cache memory 106 also resides on the processor die. The cache memory 106 may include multiple levels of cache, such as a level 1 cache and a level 2 cache. Furthermore, when there are multiple cores in the processor, each of the different levels of cache memory 106 may be shared or there may be a cache memory per core in different embodiments.

In some embodiments, the processor 100 may be an Intel® architecture microprocessor. In some embodiments, the processor 100 may include Intel SpeedStep® technology or another power management-related technology that provides for two or more voltage/frequency operating points. In some embodiments, the processor 100 may be a different type of processor such as an embedded processor or a digital signal processor.

Additionally, the processor also has an integrated memory controller 108 in many embodiments. The memory controller 108 is coupled through a processor-memory interconnect to system memory 110. The memory controller 108 enables the processor 100 and any other devices in the computer system to access system memory 110. In many embodiments, system memory 110 may comprise a form of random access memory (RAM) such as dynamic RAM (DRAM), flash memory, or another form of memory.

The processor also is coupled to a discrete input/output (I/O) complex 112 in many embodiments. In other embodiments that are not shown, the I/O complex may be integrated into the processor. The I/O complex 112 may include one or more integrated I/O host controllers (not shown) that allow I/O devices such as keyboards, mass storage devices, etc. to connect to the computer system.

The system also includes a voltage regulating meter (VRM) 114, which is coupled to the processor 100. The VRM 114 supplies a power operating voltage to the processor and may operate in accordance with a version of the Intel® Mobile Voltage Positioning (IMVP) specification such as the IMVP-6 specification. In many embodiments, different components within the processor as well as different units within the processor core may be coupled to different power planes in the processor. When there is more than one power plane designed into the processor, the VRM 114 may have the capability to change the delivered voltage to the two or more planes independently. This may allow portions of the processor to power down while other portions remain powered. The VRM 114 may include logic that is responsive to one or more signals to reduce voltage to the processor 100, including down to a zero voltage state. The VRM 114 logic may also ramp the voltage to the processor 100 back up again after exiting the zero voltage state. Furthermore, in other embodiments that are not shown, the VRM 114 may be integrated into the processor 100.

In some embodiments, the processor 100 has a dedicated save state static RAM (SRAM) memory 116 that may be used to store the processor's state information when the processor is to enter into a low voltage state or a zero voltage state. To accomplish this, the save state SRAM memory 116 is located on a separate voltage plane than the majority of the rest of the processor 100. The processor 100 also includes power state entry and exit logic 118 to control entry into and exit from a low or zero voltage state. Each power state includes a specific voltage that is used as the operating voltage fed to the processor from the VRM 114. Each specific voltage may be programmed into the VRM 114 using a voltage ID (VID) value. In many embodiments, a power state VID is paired with a specific processor operating frequency. Thus, in many embodiments, a power state table that stores voltage/frequency pairs is stored in the computer system. This table may be located within microcode in the processor 100, in storage within the I/O complex 112, in BIOS (basic input/output system) 122, or in other firmware in the system.

In many embodiments, when the computer system is operational, an operating system 124 is loaded into system memory 110. The operating system may include code to support an Advanced Configuration and Power Interface (ACPI) 126. Using this code, the operating system may have access to the power state table and command the ACPI interface to enter and exit different power states.

The I/O Complex 112 also includes a power management microcontroller 128 in many embodiments. The power management microcontroller 128 includes state control logic that may control transitions between power management states and normal operational states that are associated with the processor 100. For example, many Intel® architecture processors have a normal operational state referred to as C0. C0 generally has a high frequency mode (HFM) and a low frequency mode (LFM). On the other end of the power management spectrum, many Intel® architecture processors have a zero voltage processor "deep sleep" state referred to as C6.

At a time when the processor is running in the C0 state, an ACPI command from the operating system or from elsewhere in the computer system may be sent to the power management microcontroller 128 to bring the processor 100 down to the C6 state. In some embodiments, if the processor 100 is in the C0 HFM, it is first brought down to the C0 LFM. Then once in the C0 LFM power state, the power management microcontroller 128 may initiate the processor's entry into the C6 power state.

Specifically, the power management microcontroller 128 may send a signal to the power state entry and exit logic 118 in the processor 100 to initiate the steps to bring the processor to the C6 state. Prior to sending the processor into the C6 state, the processor requires several processor cycles to prepare to enter the state. The processor caches are flushed and then the processor architectural state is saved to prepare the processor 100 for the C6 state. The details of the process to prepare the processor for the C6 state are discussed in greater detail below in regard to the discussion related to FIG. 2. Once the processor has been prepared, the power management microcontroller 128 may then send a signal to voltage sleep logic 130 within the VRM 114 to begin the voltage ramp down from the C0 LFM state to the C6 state.

In the C6 state, the processor core voltage is reduced to zero for the majority of the processor 100, including the voltage to the core and the voltage to the caches. Additionally, the core clock is turned off and the phase locked loop (PLL) supplying the core is turned off. To accomplish this, the power management microcontroller 128 can send a signal to stop a clock generator 132 supplying the processor with a system timer signal. The system timer signal provides timer ticks to the processor at a given rate.

Generally, the processor 100 will remain in the C6 state until a wake event arrives and the power management microcontroller 128 will then begin the wakeup process. The C6 to C0 wake up process starts by ramping the voltage supplied to the processor 100 up to the C0 LFM state and then restoring the architectural state of the processor.

The total energy consumption cost to enter and then exit the C6 state is significant because this process includes flushing the processor caches, saving the architectural state of the processor, ramping down the voltage, then ramping up the voltage and restoring the state of the processor. Depending on the workload presented to the processor 100, C6 entry events and exit events spaced less than a certain number of processor cycles apart from each other can lead to greater average processor power consumption over a particular period of time than a non-zero voltage state, such as the C4 state.

The processor 100 does not have as great of a energy cost overhead entering and exiting the C4 state. For example, in the C4 state, the core voltage does not decrease to zero when in the state, thus, the voltage ramp time from C0 to C4 and back to C0 is less than the voltage ramp time from C0 to C6 and back to C0. Furthermore, the processor caches are not flushed during preparation for entering the C4 state, so the caches still receive power in the C4 state.

Thus, because of the high energy consumption overhead related to entering and exiting the C6 state, there generally exists an interrupt rate/average power consumption cross-over point between the C6 state and the C4 state. When the interrupt rate is more frequent than the cross-over point, the average processor power consumption using the C4 state is less than the average power consumption using the C6 state. As the processor interrupt rate decreases so that the interrupt rate is less frequent than the cross-over point, the average processor power consumption using the C4 state is greater than the average power consumption using the C6 state. Therefore, if there is a high frequency of processor interrupts, it becomes a disadvantage to enter the C6 state. In some embodiments, the interrupt rate cross-over point is known due to previous testing of the processor. When the interrupt rate is set to a rate that causes the average power consumption of the processor in the C6 state to equal the average power consumption of the processor in the C4 state over a given period of time, then the interrupt rate is set at a break-even power consumption value.

Due to the C6 entry/exit average power consumption overhead, the power management microcontroller 128 can implement a minimum C6 dwell time value. This value can provide a guarantee that the processor will stay in the C6 state for a minimum amount of time. Thus, upon entering the C6 state, a timer is started in some embodiments. In other embodiments, the moment the processor enters the C6 state a value of a system timer not affected by the C6 state is saved. The C6 minimum dwell time value can then be added to the value of the timer. The result (i.e. the minimum value the timer must be before beginning the process of leaving the C6 state) can be used to compare to the system timer and if a break event (i.e. interrupt) to remove the processor from the C6 state is received prior to the result value, the break event can be held back from causing the exit from C6 process. In other words, if a processor interrupt arrives prior to the timer reaching the minimum C6 dwell time, then the interrupt is not serviced immediately.

In many embodiments, interrupts can accumulate in an interrupt queue. Additionally, the minimum C6 dwell time may be programmed such that no more than one additional system timer tick is held off. If the system timer is held off for more than one additional timer tick, the system may accrue drift error due to interrupts not being serviced with sufficient frequency. Therefore, the minimum C6 dwell time may have a range of values from zero (i.e. when the minimum C6 dwell time is disabled) up to a maximum dwell time—a time that above which would cause the system timer to be held off for two or more system timer ticks.

The minimum C6 dwell time value may be stored in a register within the power management microcontroller 128, stored in the BIOS 122, or stored elsewhere within the computer system. The minimum C6 dwell time value can be programmed dynamically during operation of the computer system using software controlled by the OS 124, controlled by the processor microcode 120, or elsewhere. Alternatively, the minimum C6 dwell time can be programmed once at system start up by the BIOS 122.

Figure 2:
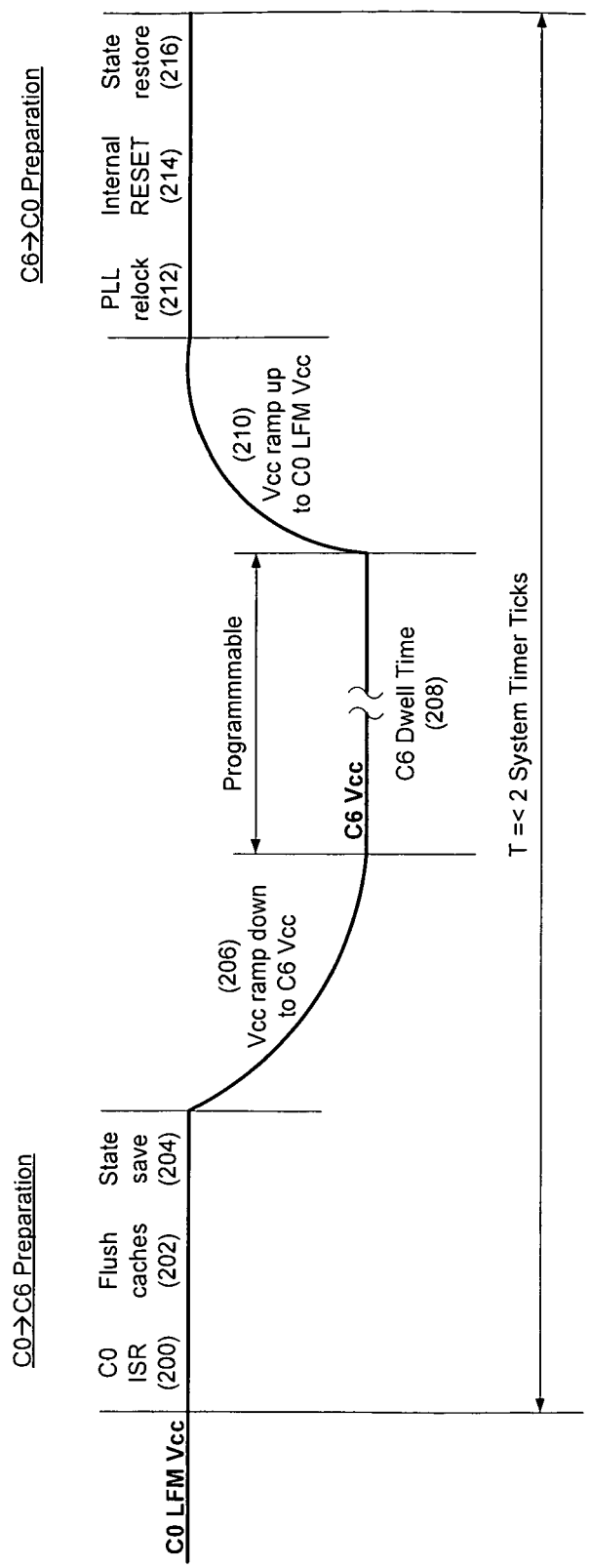
FIG. 2 is a flow diagram of an embodiment of a process to transition between a C0 processor power state and a C6 processor power state while using a programmable dwell time while in the C6 processor power state.

FIG. 2 is a flow diagram of an embodiment of a process to transition between a C0 processor power state and a C6 processor power state while using a programmable dwell time while in the C6 processor power state. The process is performed by processing logic which may comprise hardware, software, or a combination of both. The processor begins the process in a C0 LFM power state. In some embodiments, if the processor is in a C0 HFM state, prior to the process beginning, the power management microcontroller or other power managing logic within the computer system transitions the processor from the C0 HFM state to the C0 LFM state.

Thus, when the processor starts the process, it has a power supplied voltage (Vcc) that is the C0 LFM voltage. Turning now to FIG. 2, the process begins by processing logic servicing an interrupt service routine (ISR) while in the C0 LFM state (processing block 200). This ISR informs the processor prepare to enter the C6 state. Then processing logic within the processor flushes the processor caches (processing block 202). In some embodiments, the cache flush includes the processor's L1 and L2 caches.

Next, processing logic saves the state of the processor (processing block 204). The state of the processor may include saving information such as critical register values and current pipeline information within the processor core to maintain the state of the processor currently. The processor state is saved in an SRAM that is powered by a separate power plane than the plane that powers the majority of processor including the execution unit, caches, clocks, etc. Thus, when the main power plane that powers the majority of the processor is powered down, the SRAM power plane remains powered up and maintains the critical processor state information at a minimal power consumption cost. In many embodiments, there are additional specific processing steps required to prepare the processor for the C6 state. These additional steps can be found in documentation related to one or more processors that are capable of utilizing the C6 processor power state.

Processing logic then begins the main processor voltage (Vcc) ramp down to the C6 Vcc (processing block 206). In some embodiments this is a zero voltage state. In other embodiments, the state includes a very minimal positive voltage value such as 0.3V. Once the voltage has completed the ramp down and arrives at the C6 Vcc value, processing logic begins to track the C6 dwell time (processing block 208). The C6 dwell time is a fully programmable time that has a lower limit (zero) when the C6 minimum dwell time logic is disabled and an upper limit. The upper limit of the C6 minimum dwell time is an amount of time within the C6 state that puts a two system timer tick limit on the time it takes to bring the processor from the operational C0 LFM state, down to the C6 state, and back up to the operational C0 LFM state. In other words, processing blocks 200-206 (i.e. the blocks that prepare and then bring the processor from the operational C0 LFM state to the C6 state) and processing blocks 210-216 (i.e. the blocks that bring the processor from the C6 state back up to an operational C0 LFM state) each have a finite and mostly deterministic time requirement to process. The only variable value within the entire process is the C6 dwell time value at block 208. Thus, the upper limit (UL) of the programmable C6 minimum dwell time (MDT) would be the following equation:

$$UL \text{ of } C6\ MDT = 2 \text{ system timer ticks} - (\text{sum of } 200\text{-}206\ \&\ 210\text{-}216 \text{ time reqs})$$

After the C6 dwell time, processing logic then begins the processor Vcc ramp up from the C6 Vcc level to the C0 LFM Vcc level (processing block 210). After the Vcc level has returned to the C0 LFM Vcc level, processing logic does a PLL relock routine to get a valid clock signal in the processor (processing block 212). The PLL relock is required because the PLL supplying the processor with the clock signal is turned off during the C6 state to save additional power.

Once the PLL has been relocked and a valid clock is available in the processor, processing logic then performs an internal RESET of the processor (processing block 214). The internal RESET allows the processor to reset the hardware and begin operating normally again. After the hardware has been reset, processing logic then restores the state of the processor that was previously saved in block 206 (processing block 216). When the state is restored, the processor can begin normal operations again as it left them when the initial ISR was serviced in block 200 and the process is finished.

In many embodiments, the average power consumption of the processor is tracked across a rolling window of time and the C6 minimum dwell time value is increased or decreased dynamically in response to the average power consumption of the processor. For example, if a certain workload is causing frequent entry and exits to and from the C6 power state, logic within the power management microcontroller may realize that the workload is causing severe power spikes due to the entry and exit C6 power requirements. This may lead the power management microcontroller to increase the C6 minimum dwell time so that once in the C6 state, the processor must remain there until the average power consumption makes it beneficial to have entered the state in the first place. Alternatively, if there are very few entries into the C6 state, the power management microcontroller may reduce the C6 minimum dwell time to increase processor performance.

In other embodiments, the dwell time may not be confined to the C6 state. Rather, any two processor power states may have an interrupt rate cross-over point for power efficiency where interrupts arriving at a rate greater than the cross-over point may lead to greater power efficiency in a first state whereas interrupts arriving at a rate less than the cross-over point may lead to greater power efficiency in a second state. If the cross-over point for two given states is known, the minimum dwell time in one of the states can be increased or decreased as needed to provide for less average power consumption whenever the processor is in the given state. Because this process is designed to provide the processor with greater average power consumption efficiency in a given state, this process may not lead to the highest performance in the processor. Thus, a tradeoff between performance and power may sometimes be necessary.

Thus, embodiments of a method, device, and system for enforcing a minimum dwell time a processor must remain in a particular power state are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
causing a processor to enter into a first power state;
receiving an interrupt to signal the processor to leave the first power state;
causing the processor to remain in the first power state if the interrupt was received less than a minimum dwell time after the processor entered the first power state;
determining an average time between interrupts to the processor over a determined length of time in the first power state; and
increasing the minimum dwell time when the average time between interrupts is less than a determined break even interrupt rate value.

2. The method of claim 1, further comprising:
determining an average power consumption of the processor over a determined length of time in the first power state; and
increasing the minimum dwell time when the average power consumption is greater than a determined break even power consumption value.

3. The method of claim 2, wherein the determined break even power consumption value further comprises an average power consumption of the processor over the determined length of time in a second power state.

4. The method of claim 1, wherein the determined break even interrupt rate value further comprises an interrupt rate at which an average power consumption of the processor in the first power state over a determined length of time is equal to an average power consumption of the processor over the determined length of time in a second power state.

5. The method of claim 1, further comprising programming the minimum dwell time dynamically during operation of the processor.

6. A device, comprising:
a power management microcontroller to:
cause a processor to enter into a first power state, the processor to receive an interrupt to signal the processor to leave the first power state;
cause the processor to remain in the first power state if the interrupt was received less than a minimum dwell time after the processor entered the first power state;
determine an average time between interrupts to the processor over a determined length of time in the first power state; and
increase the minimum dwell time when the average time between interrupts is less than a determined break even interrupt rate value.

7. The device of claim 6, wherein the power management microcontroller is operable to:
determine an average power consumption of the processor over a determined length of time in the first power state; and
increase the minimum dwell time when the average power consumption is greater than a determined break even power consumption value.

8. The device of claim 7, wherein the determined break even power consumption value further comprises an average power consumption of the processor over the determined length of time in a second power state.

9. The device of claim 6, wherein the determined break even interrupt rate value further comprises an interrupt rate at which an average power consumption of the processor in the first power state over a determined length of time is equal to an average power consumption of the processor over the determined length of time in a second power state.

10. The device of claim 6 wherein the power management microcontroller is operable to:
program the minimum dwell time dynamically during operation of the processor.

11. A system, comprising:
an interconnect;
a processor coupled to the interconnect; and
a memory coupled to the interconnect, the memory to store software to program a minimum dwell time for the processor in a C6 power state; and
a power management microcontroller, coupled to the interconnect, the power management microcontroller to:
cause the processor to enter into the C6 power state;
receive an interrupt to signal the processor to leave the C6 power state;
cause the processor to remain in the C6 power state if the interrupt was received less than a minimum dwell time after the processor entered the C6 power state;
determine an average time between interrupts to the processor over a determined length of time in the C6 power state; and
increase the minimum dwell time when the average time between interrupts is less than a determined break even interrupt rate value.

12. The system of claim 11, wherein the power management microcontroller is operable to:
determine an average power consumption of the processor over a determined length of time in the C6 power state; and
increase the minimum dwell time when the average power consumption is greater than a determined break even power consumption value.

13. The system of claim 12, wherein the determined break even power consumption value further comprises an average power consumption of the processor over the determined length of time in a second power state.

14. The system of claim 11, wherein the determined break even interrupt rate value further comprises an interrupt rate at which an average power consumption of the processor in the C6 power state over a determined length of time is equal to an average power consumption of the processor over the determined length of time in a second power state.

15. The system of claim 11 wherein the power management microcontroller is operable to:
   program the minimum dwell time dynamically during operation of the processor.

16. The system of claim 11, wherein the power management microcontroller further comprises:
   a minimum dwell time register to store the programmed minimum dwell time.

17. The system of claim 16, further comprising:
   a basic input/output system (BIOS) to program the minimum dwell time register during system boot.

* * * * *